(12) United States Patent
Schroeder

(10) Patent No.: US 6,446,913 B1
(45) Date of Patent: Sep. 10, 2002

(54) DEVICE FOR FIXING AND ALIGNING AN APPARATUS IN A HOLDER FRAME

(75) Inventor: Harald Schroeder, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/509,111

(22) PCT Filed: Apr. 22, 1999

(86) PCT No.: PCT/DE99/01209

§ 371 (c)(1),
(2), (4) Date: Jun. 9, 2000

(87) PCT Pub. No.: WO00/05551

PCT Pub. Date: Feb. 3, 2000

(51) Int. Cl.[7] .......................... G12B 9/00; G01C 21/16; G01C 21/20; B60K 35/00
(52) U.S. Cl. .................................. 248/27.1; 248/222.52
(58) Field of Search ................................. 248/425, 130, 248/27.1, 27.3, 222.52, 223.31, 223.41, 224.8, 225.11, 225.21, 371

(56) References Cited

U.S. PATENT DOCUMENTS

| | | | | |
|---|---|---|---|---|
| 3,655,154 A | * | 4/1972 | Orts | 248/27.1 |
| 3,689,013 A | * | 9/1972 | Neugebauer | 248/27.1 |
| 4,880,191 A | * | 11/1989 | Lake, Jr. | 248/371 |
| 5,225,970 A | * | 7/1993 | Palumbo | 361/807 |
| 5,398,903 A | * | 3/1995 | Cho | 248/349.1 |
| 6,055,857 A | * | 5/2000 | Kerchaert | 74/431 |
| 6,203,366 B1 | * | 3/2001 | Muller et al. | 439/561 |

FOREIGN PATENT DOCUMENTS

| | | |
|---|---|---|
| EP | 0 810 419 A | 12/1997 |
| JP | 09 042990 A | 2/1997 |

* cited by examiner

*Primary Examiner*—Anita King
(74) *Attorney, Agent, or Firm*—Kenyon & Kenyon

(57) ABSTRACT

A device for mounting and aligning an apparatus on a holding frame, where the apparatus is arranged on a holding part that abuts against the holding frame with a contact surface, and is fastened to the holding frame in a manner allowing rotation about an axis of rotation running perpendicular to the contact surface. A coupling part may be fastened to the holding part on the side of the holding frame facing away from the holding part using fasteners, which reach through at least one opening provided in the holding frame. A fixing device is provided which, during the fastening of the coupling part to the holding part, defines the position of the coupling part relative to the holding part in relation to a predefined alignment. An arrangement is provided for locking the holding part on the holding frame in an adjustable rotational position.

17 Claims, 4 Drawing Sheets

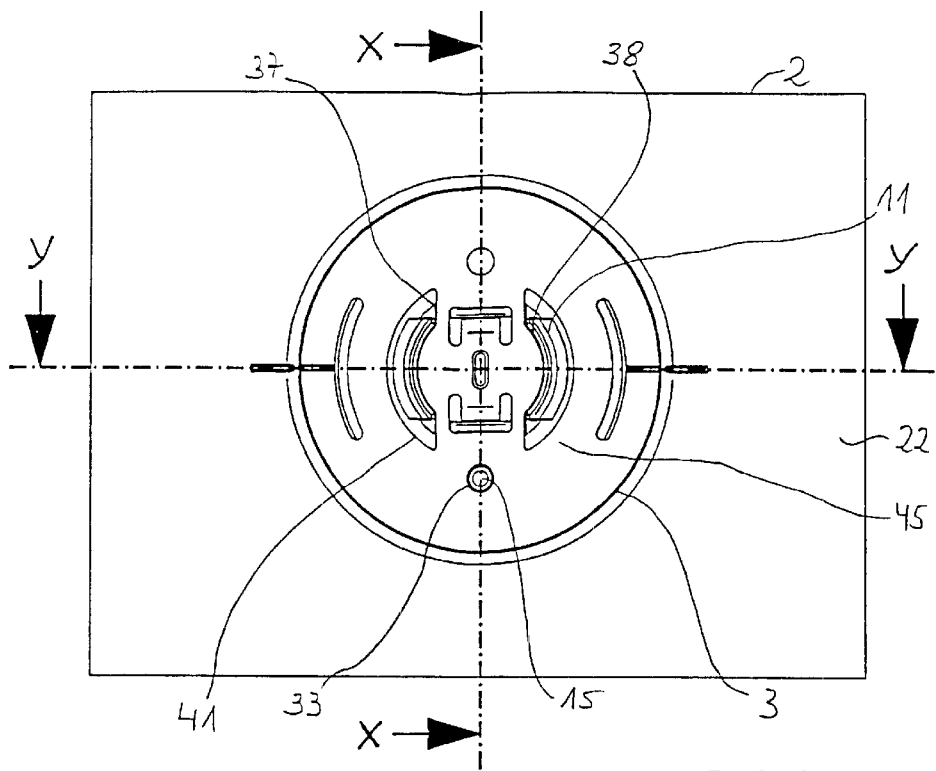
FIG.2
FIG.3
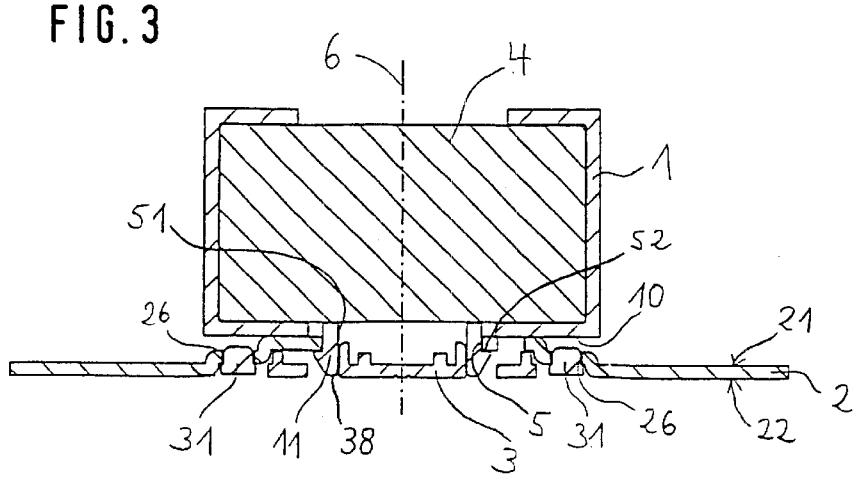

DEVICE FOR FIXING AND ALIGNING AN APPARATUS IN A HOLDER FRAME

FIELD OF THE INVENTION

The present invention relates to a device for mounting and aligning an apparatus on a holding frame.

BACKGROUND INFORMATION

Navigation devices installed in motor vehicles have apparatuses, such as engine speed sensors or gyrometers, which must be mounted in the vehicle plumb or with a definitively preselected alignment in relation to gravity. Greater deviations from this alignment are unacceptable. In known methods heretofore, speed sensors are fastened to a holding frame of the navigation device in a specific predefined position, for example, fixed in position using screws. Subsequently, the holding frame must be fitted in the motor vehicle always in the same fitting position, the fitting position depending on the alignment of the speed sensor on the holding frame. However, the narrow fitting conditions in motor vehicles make it increasingly necessary to install navigation devices in a motor vehicle in different fitting positions. Thus, it must be possible, for example, to install a navigation device in a motor vehicle alternatively horizontally or vertically. In particular, it is required to be able to fasten the holding frame in the vehicle in a fitting position which, starting from a horizontal alignment, is tilted or inclined by a specific angle. It is a disadvantage of the related art that the alignment of the speed sensor on the holding frame must be changed for this purpose in a manner requiring considerable outlay. Since the speed sensor is generally fastened to a side wall inside the housing of the navigation device, the housing must be opened first, and the speed sensor must be fastened anew to the side wall in a different angular position. In terms of assembly technology, this is very costly and requires fastening devices to be provided at the side wall which are adapted to the different angular positions, for example, numerous boreholes corresponding to the different angular positions for passing through screws.

SUMMARY OF THE INVENTION

The device according to the present invention for mounting and aligning an apparatus on a holding frame avoids the disadvantages occurring in the related art. It is advantageously achieved that the position of an apparatus on a holding frame, for example, the position of a speed sensor arranged in a navigation device, can be flexibly adapted to the vertical, horizontal, or inclined installation of the holding frame in a very simple manner without greater assembling effort. The device is inexpensive and easy to manufacture. The apparatus is advantageously arranged on a holding part, which is rotatably fastened to the holding frame. In this manner, different angular positions of the apparatus can be adjusted without difficulty. In this context, the correct angle of rotation is adjusted by a coupling part, which, on the side of the holding frame facing away from the holding part, can be fastened to the holding part using fasteners, which protrude through at least one opening formed in the holding frame, the position of the coupling part relative to the holding part being determined by a fixing device in relation to a predefined alignment. Consequently, by rotating the coupling part, a defined rotation of the holding part and the apparatus mounted thereto into a specific angular position is effected, which can be read off from the rotational position of the coupling part in relation to the holding frame. Markings on the coupling part and the holding frame can make it easier to find an angle of rotation to be adjusted. Moreover, the coupling part is advantageously used as handling part to make it easier to rotate the holding part from the side of the holding frame facing away from the holding part. This rotation can be carried out manually or by a tool. In the adjusted rotational position, the holding part can be locked on the holding frame, and is consequently reliably secured in position against unintentional rotation. It is a further advantage that the holding frame needs not to be provided with any openings, projections, or fastening aids, which depend on the angle of rotation. Consequently, the holding frames can be manufactured always in the same manner independently of the fitting position in the motor vehicle, which is the way production cost can be reduced.

It is particularly advantageous to provide coupling elements as means for locking the holding part on the holding frame, the coupling elements being formed on the coupling part and the holding frame, and which engage with each other so as to lock in a specific rotational position, thereby determining the angle of rotation of the holding part in relation to a given end position. Then, one simply manufactures a set of coupling parts for the different fitting positions of the holding frame, the coupling elements being arranged on each coupling part differently. To adjust a predefined angle of rotation of the holding part, the coupling part manufactured for this angle of rotation is then simply fastened to the holding part, and the arrangement formed of coupling part and holding part is rotated until the coupling elements engage with each other.

It is a further advantage if the coupling part fastened to the holding part is pressed against the holding frame under elastic prestress, and that the coupling elements engage with each other under prestress in the predefined end position of the holding part.

The coupling elements can be manufactured in a simple and inexpensive manner with at least one opening provided in the holding frame and at least one projection formed on the coupling part, which projects toward the holding frame and catches so as to lock in the opening in the predefined end position.

It is also expedient to shape the fasteners of the coupling part to the holding part in the form of detention arragements. These detention arragements can be formed on the holding part and/or the coupling part, for example, as elastically flexible detent hooks. When the coupling part is snapped onto the holding part, the coupling part is then pressed against the holding frame under elastic prestress in a simple manner.

Expediently, the holding part is also rotatably fastened to the holding frame via detention arragements. The detention arragements can grip behind the edge of at least one circular cutout of the holding frame and, in this manner, expediently form a rotary joint for the holding part. In this context, the circular cutout can at the same time be used as an opening for passing through the fasteners of the coupling part to the holding part.

It is a further advantage if a journal, which projects from the contact surface of the holding part toward the holding frame and is radially set apart from the axis of rotation, is arranged in a connecting link guide of the holding frame in a manner that it is slidingly displaceable. The angular range, by which the holding part can be rotated on the holding frame, can advantageously be adjusted via the connecting link guide. Thus, in narrow fitting conditions, the apparatus is prevented from striking against other component parts fastened to the holding frame.

If the journal concurrently engages with an opening formed in the coupling part, then the journal serves at the same time as fixing device for aligning the coupling part on the holding part.

In another exemplary embodiment, a coulisse is formed in the holding frame as arragements for locking the holding part on the holding frame, a screw, which can be fastened to the holding part, being arranged in the coulisse in a manner that it is slidingly displaceable in the untightened condition. By tightening the screw in the adjusted rotational position of the holding part, the coupling part and the holding part coupled thereto are securely fastened to the holding frame. However, the screw guided in the coulisse can also be provided as an additional locking device in conjunction with the coupling elements formed on the coupling part and the holding frame.

Moreover, it is particularly advantageous to design the coupling part in such a manner that a tool can be inserted in the coupling part, the tool allowing the apparatus arranged on the holding part to be aligned vertically from the side of the holding frame facing away from the holding part.

BRIEF DESCRIPTION OF THE DRAWINGS

FIG. 2 shows a top view of the holding frame, with a coupling part designed for an angle-of-rotation position of 0° being fastened to the holding part according to an embodiment of the present invention.

FIG. 3 shows a cross-section through FIG. 2 along line Y—Y according to an embodiment of the present invention.

DETAILED DESCRIPTION

Figure 1:
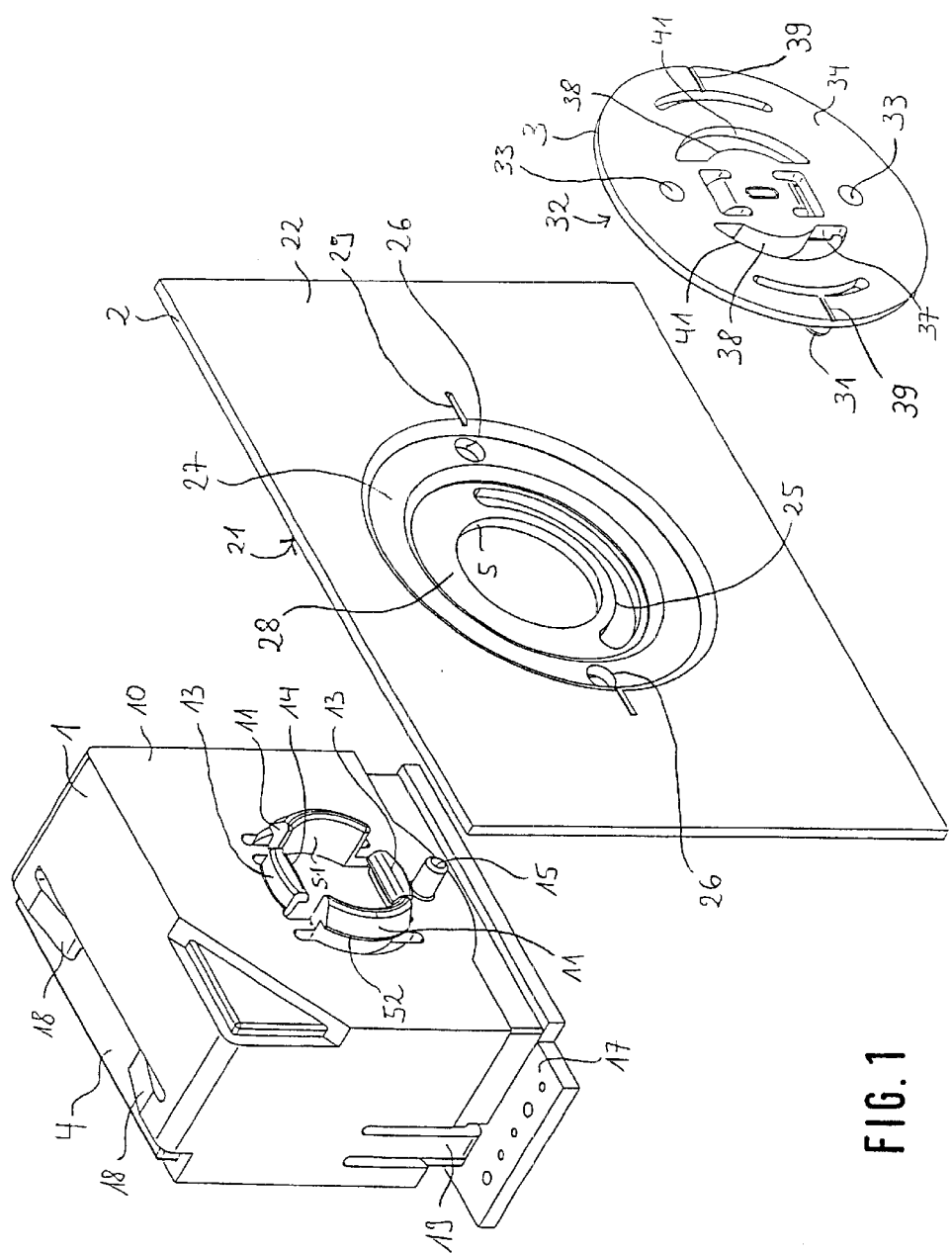
FIG. 1 shows a perspective view of a first exemplary embodiment of the device according to the present invention.

FIG. 1 shows a perspective view of the device according to the present invention for mounting and aligning an apparatus 4 on a holding frame 2. In this exemplary embodiment of the present invention apparatus 4 is a speed sensor, and holding frame 2 is the side wall of the housing of a navigation device, speed sensor 4 being arranged inside an enclosed (not further shown) housing of the navigation device. However, apparatus 4 can be any other device which needs to be aligned in a predefined angular position in relation to gravity. Moreover, the holding frame does not necessarily have to be the side wall of an enclosed housing, but can be formed, for example, as a holding bar or similar part.

As is visible in FIG. 1, apparatus 4 is secured in the receptacle of a holding part 1. Holding part 1 is manufactured in one piece as a box-like receptacle part made of plastic, for example, as a injection-molded part. However, other forms and materials are conceivable, as well. Apparatus 4 is fastened using elastically resilient detents 18 and detent hooks 19 located opposite. The more or less cuboidal apparatus 4 is inserted into the box-like receptacle part of holding part 1 from the side opposite detents 18, and pressed against the elastically flexible detents until detent hooks 19 grip behind the bottom side of the apparatus. Electrically connected to apparatus 4 at the bottom side of the apparatus is a printed-circuit board 17, on which connections for external electrical lines for the connection to other component parts of the navigation device can be arranged. A plane lateral surface 10 of holding part 1 is used as contact surface to abut against a first side 21 of holding frame 2.

In this exemplary embodiment of the present invention, holding frame 2 is manufactured as bent punching from a sheet-metal plate, but can also be made of plastic or other materials. In the simplest case, holding frame 2 is a simple sheet-metal plate. Provided in side 22 of holding frame 2 facing away from holding part 1 is a plate-shaped depression 27, in which a second plate-shaped depression 28 is provided concentrically. On side 21 of holding frame 2 facing holding part 1, depressions 27, 28 form two bulges arranged concentrically to each other, the outer surface of outermost bulge 28 facing holding part 1 being intended as flat support for contact surface 10 of holding part 1. In the middle of bulge 28, a circular cutout or a circular opening 5 is provided in holding frame 2.

To fasten holding part 1 to the holding frame, provision is made for elastically flexible detention arrangements 11, which, in this exemplary embodiment project from contact surface 10 of the holding part toward the holding frame. However, it is also conceivable to form the detention arrangements on side 21 of holding frame 2 facing holding part 1. Detention arrangements 11, in the form of two cylinder wall segments 51 arranged concentrically to each other, are integrally formed with the holding part. The ends of the cylinder wall segments are provided in a barb-like manner with shoulders 52 projecting radially outward. During the insertion into the circular cutout 5, detention arrangements 11 spring back behind the edge of cutout 5, and make contact on the edge of cutout 5 via shoulders 52, as is clearly visible in FIG. 3. In this context, cylinder wall segments 51 make contact on diametrically opposing sections of the inside wall of cutout 5. By securing holding part 1 to cutout 5 as described above, holding part 1 is fastened to holding frame 2 in a manner allowing rotation about an axis of rotation 6 running perpendicular to contact surface 10 through the center point of circular cutout 5. In this context, holding part 1 is aligned on the holding frame in the axial direction by shoulders 52 and contact surface 10, and in the radial direction by detention arrangements 11, but is rotatable about axis of rotation 6. As can further be gathered from FIG. 1 and FIG. 4, provision is made for a journal 15, which projects from contact surface 10 and is radially set apart from the axis of rotation, and which, during the engagement of holding part 1, engages with a connecting link guide 25 formed in the holding frame. Connecting link guide 25 is formed in plate-like depression 28 concentrically to axis of rotation 6 of the holding part. Connecting link guide 25 limits the angle of rotation of holding part 1 to a predefined angular range so as to prevent, for example, holding part 1 from striking against other component parts of the navigation device, which are not shown, during the rotation about axis of rotation 6. Of course, there are also different ways of fastening holding part 1 to the holding frame in a manner allowing rotation about an axis of rotation 6. It is conceivable, for example, to replace circular opening 5 with two connecting link guides arranged concentrically to axis of rotation 6, and to make detent hooks 11 engage with the connecting link guides or to movably fasten a cylindrical stub axle projecting from the holding part in circular opening 5.

Figure 4:
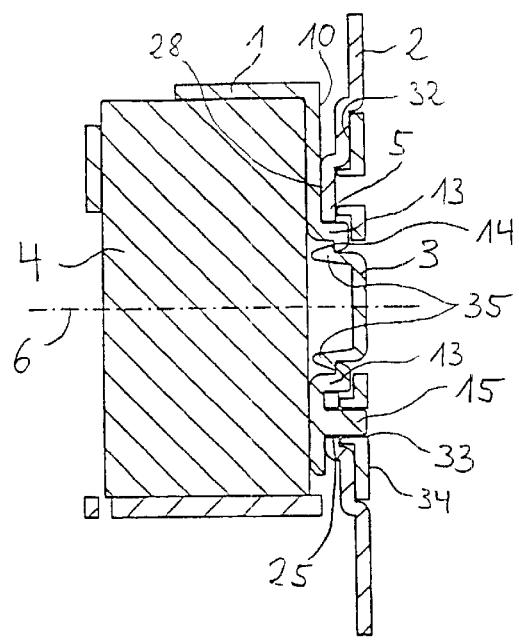
FIG. 4 shows a cross-section through FIG. 2 along line X—X according to an embodiment of the present invention.

As FIGS. 1 through 4 also reveal, provision is made for a coupling part 3, which, in the exemplary embodiment shown here, is formed of a disk-shaped base member having a first side 34 and a second side 32 opposed thereto. Second side 32 forms a plane contact surface to abut against plate-like depression 27 of holding frame 2. As shown in FIG. 2, the diameter of disk-shaped coupling part 3 is dimensioned a little smaller than the outside diameter of depression 27. As can also be seen in FIG. 1 through FIG. 4, two C-shaped cutouts 41 facing each other with their concave sides are provided in the central region of coupling part 3, the cutouts being surrounded by an outer ring 45. C-shaped cutouts 41 are separated from one another by a diametrical web 37. In the middle of web 37, a centering cylinder part 38 is formed by two cylinder segment-shaped cheeks integrally formed with web 37. Cylinder segment-shaped cheeks 38 are arranged concentrically to axis of rotation 6 or coaxially to the outer ring of the disk-shaped base member. Furthermore, two journal-like projections 31 are formed on second side 32 of the coupling part facing holding frame 2, the journal-like projections projecting vertically from second side 32 toward the holding frame. Moreover, on second side 32 of coupling part 3, two detent hooks 35 project from web 37 toward the holding frame, as can be seen in FIG. 4. Furthermore, a circular opening 33 is provided in coupling part 3 to receive journal 15 projecting from holding part 1.

As can also be seen in FIG. 1 and FIG. 4, two detent hooks 13 are formed on holding part 1, which, in a similar manner as detention arrangements 11, are designed in the form of two cylinder wall segments arranged concentrically to axis of rotation 6. Unlike with detention means 11, shoulders 14 project radially inward from the cylinder wall segments. Moreover, on side 22 of holding frame 2 facing coupling part 3, two openings 26 are provided in depression 27 to receive projections 31 of coupling part 3.

While holding part 1 is rotatably fastened to holding frame 2 as described above, at this point, coupling part 3 can be snapped onto holding part 1 from side 22 of the holding frame. In the process, in an arbitrary rotational position of holding part 1, coupling part 3 is inserted in depression 27 in such a manner that detent hooks 35 reach through opening 5 and spring back behind shoulders 14 of detent hooks 13 formed on the holding part. In the process, as shown in FIG. 2 and FIG. 3, cheeks 38 make contact on the inside wall of cylinder wall segments 51 in a positive locking manner, while web 37 makes contact on the edges of cylinder wall segments 51. In this context, the ends of detention means 11 engage with openings 41. In this exemplary embodiment of the present invention cheeks 38, web 37, and cylinder wall segments 51 of detention arrangements 11 are designed in such a manner that the coupling part can only be fastened to holding part 1 in two possible alignments. By the special design of cheeks 38, web 37, and cylinder wall segments 51, therefore, a fixing device is formed, which limits the position of coupling part 3 relative to holding part 1 to two possible alignments. As additional fixing aid, journal 15 of holding part 1 engages with opening 33 of coupling part 3 through connecting link guide 25, as is clearly visible in FIG. 4. If only one opening 33 is provided in the coupling part, then the position of coupling part 3 relative to holding part 1 is definitely determined. In the exemplary embodiment of the present invention shown in FIGS. 1 through 4, provision is made for two openings 33 mutually opposing at the same distance in relation to axis of rotation 6. Thus, the coupling part can be fastened to the holding part in a first alignment and in a second alignment rotated by 180° relative thereto. However, since in this exemplary embodiment, provision is also made for two projections 31 and openings 26 mutually opposing relative to the axis of rotation, it is always possible to definitely determine the alignment of holding part 1 on the holding frame by holding part 1.

When snapping coupling part 3 onto holding part 1 in an arbitrary rotational position of the holding part, projections 31 of coupling part 3 are pressed against the surface of depression 27 facing the coupling part under elastic pre-stress. This is possible without difficulty because coupling part 3 is made of elastically flexible plastic. If coupling part 3 is now rotated about axis of rotation 6 using a tool engaging with openings 41, then the holding part corotates with the coupling part since both are interconnected via detent hooks 35,13 and the above-described fixing device in a manner that they are locked against rotation. If coupling part 3 is now rotated until markings 39 on side 34 of the coupling part match markings 29 on side 22 of the holding frame, then projections 31 catch so as to lock in openings 26. In this adjusted rotational position, which is shown in FIGS. 2 through 4, the holding part now makes contact on holding frame 2 in a manner that it is locked against rotation. The connection can be loosened by bending back detent hooks 35.

Figure 5:
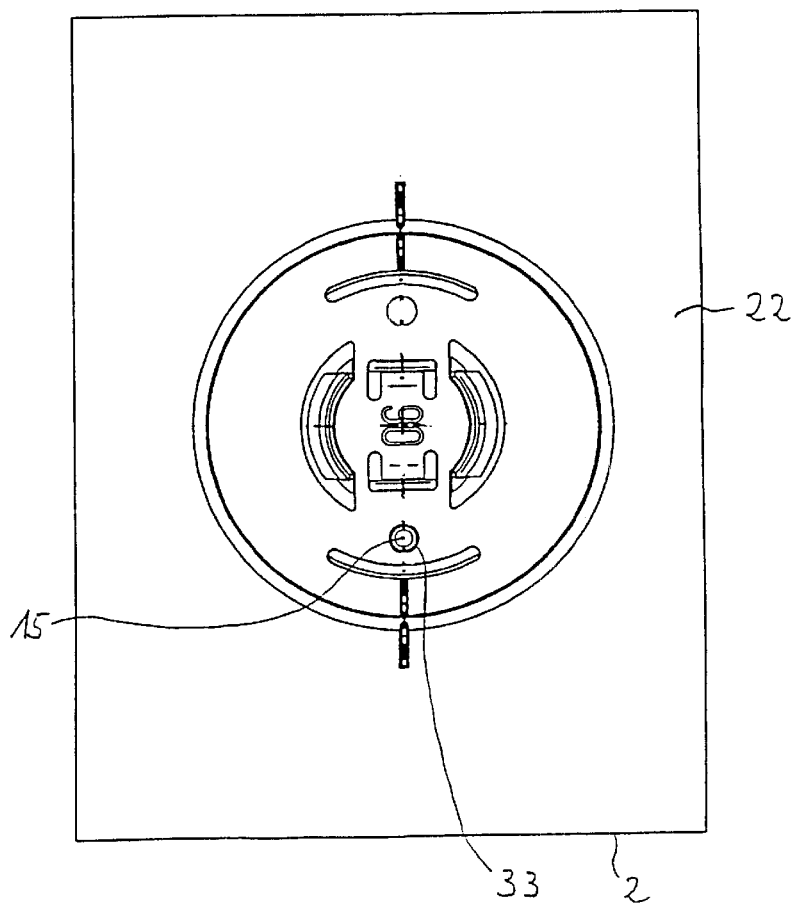
FIG. 5 shows a top view of the holding frame, with another coupling part designed for an angle-of-rotation position of 90° being fastened to the holding part according to an embodiment of the present invention.

In FIGS. 1 through 4, projections 31 are provided on coupling part 3 in such a manner that when they snap into openings 26, holding part 1 is in angular position 0°. In this angular position, the apparatus arranged on holding part 1 is aligned plumb in relation to gravity, provided that holding frame 2 has been fitted horizontally in the motor vehicle, therefore, provided that in FIG. 1, a connecting straight line running through the two openings 26 is arranged parallel to the earth's surface. If holding frame 2 has now been fitted in the motor vehicle in a fitting position which is rotated by 90° about axis of rotation 6, then a different coupling part 3 depicted in FIG. 5 is used to align holding part 1, where projections 31 are provided on side 32 of the coupling part facing the holding frame in such a manner that they are correspondingly rotated by 90° in relation to fixing opening 33. Following the snapping on of the coupling part, the arrangement formed of coupling part and holding part is rotated again until projections 31 engage with openings 26. Subsequently, holding part 1, together with apparatus 4, is in the aligned position shown in FIG. 4, which is recognizable by fixing journal 15 of the holding part being rotated by 90°. In the same way, specially made coupling parts having projections 31 can be used for all other fitting angles of holding frame 2, the projections being arranged on the coupling part in relation to fixing device 51, 38, 37 in such a manner that holding part 1 is always aligned plumb in the adjusted end position. It is particularly advantageous that the described device allows holding part 1 to be aligned even when the holding part is arranged in a housing and only side 22 of the holding frame facing away from the holding part can be accessed from outside. Of course, other designs of the exemplary embodiment of the present invention shown in FIGS. 1 through 4 are possible, where, for example, projections 31 are formed on the holding frame and openings 26 are formed on the coupling part. Detent hooks 35 and 13 can also be designed differently and need not necessarily to protrude through opening 5. For example, it is also possible to join detent hooks 35 to the holding part via two coulisse-like openings of the holding frame, which are arranged concentrically to axis of rotation 6. Other designs of the fixing device are equally possible. Thus, it is conceivable to dispense with journal 15. Also, it is possible for cheeks 38 to have a star-shaped, square, or other design, and to engage with a complementary opening formed in the holding part.

Figure 6:
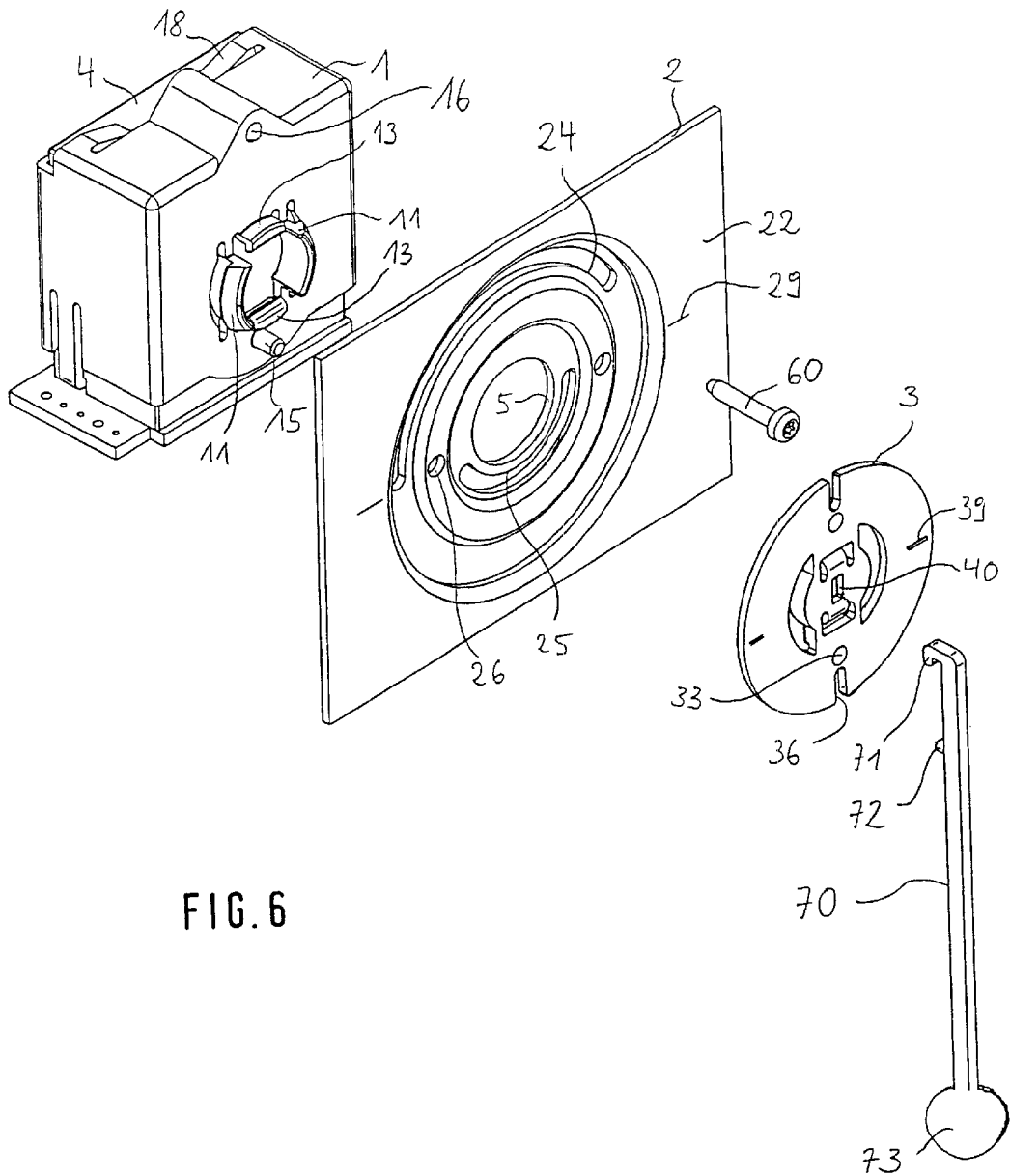
FIG. 6 shows a perspective view of a second exemplary embodiment of the device according to the present invention.

FIG. 6 shows a further exemplary embodiment of the present invention. Identical parts are provided with identical reference numerals. In contrast to the exemplary embodiment shown in FIG. 1, coupling part 3 depicted in FIG. 6 has no projections catching so as to lock in opening 26. Nor is provision made for other coupling elements on the coupling part to engage with coupling elements of the holding frame in the desired rotational position of the holding part. Instead, provision is made for a further connecting link guide 24 arranged concentrically to axis of rotation 6. The distance of connecting link guide 24 from the axis of rotation is selected to be greater than radius of disk-shaped coupling part 3, so that connecting link guide 24 is arranged outside the area of holding frame 2 covered by coupling part 3. A screw 60 is screwed into a receptacle 16 of the holding part through coulisse 24. Furthermore, two openings 40 and 36 are provided in coupling part 3 on side 22 facing away from the holding frame, it being possible to insert a tool 70 into the openings. Tool 70 includes a rod-shaped base member whose one end is formed with a hook 71 for hooking in an opening 40 of the coupling part. Opening 40 is provided in the center of disk-shaped coupling part 3. At the edge of disk-shaped coupling part 3, provision is made for a further opening 36, with which a pin 72 projecting from the rod-shaped base member of the tool can be engaged. The end of tool 70 facing away from hook 71 is provided with a weight 73. When holding frame 2 is fastened in the vehicle and holding part 1 is rotatably secured to holding frame 2, coupling part 3 shown in FIG. 6 is fastened to holding part 1 by detent hooks 35.

Subsequently, screw 60, which is provided as locking means, is passed through coulisse 24 and screwed into receptacle 16, or secured in position in a corresponding manner. However, screw 60 is not firmly tightened yet. At this point, with screw 60 in the untightened condition, tool 70 is inserted into openings 40 and 36 of coupling part 3 in an arbitrary rotational position of holding part 1. Then, the force due to weight of weight 73 rotates coupling part 3, and holding part 1 joined thereto via detent hooks 35, about axis of rotation 6 into the plumb alignment. Subsequently, screw 60 is tightened and presses itself against holding frame 2 with its screw head whereby holding part 1 is locked on holding frame 2, now being fastened to the holding frame in a manner that it is protected against rotation.

Of course, the device shown here for mounting and aligning an apparatus on a holding frame allows the apparatus to be aligned about one axis of rotation only. If the apparatus is a speed sensor, this requires the apparatus to be already aligned in the two other directions in space. In practice, this does not involve any limitation to the use, since the holding frames of electrical or electronic devices arranged in a motor vehicle are always fitted in the motor vehicle in a horizontal fitting position in relation to the earth's surface, or in a position which is rotated out of the horizontal position by a rotation about only one axis.

What is claimed is:

1. A device for mounting and aligning an apparatus, comprising:
   a holding frame;
   a holding part on which the apparatus is arranged, the holding part having a contact surface abutting against the holding frame and being fastened to the holding frame to allow a rotation about an axis of rotation running perpendicular to the contact surface;
   a plurality of fasteners reaching through at least one opening in the holding frame;
   a coupling part fastened on a side of the holding frame facing away from the holding part, the coupling part fastened to the holding part using the plurality of fasteners;
   a fixing device defining a position of the coupling part relative to the holding part in relation to a predefined alignment during a fastening of the coupling part to the holding part; and
   an arrangement for locking the holding part on the holding frame in an adjustable rotational position.

2. The device of claim 1, wherein the arrangement for locking includes a plurality of coupling elements disposed on the coupling part and on the holding frame, the coupling elements defining an angle of rotation of the holding part in relation to a predefined end position by automatically engaging with each other in a specific rotational position of the holding part when the coupling part is fastened to the holding part.

3. The device of claim 2, wherein the coupling part fastened to the holding part is pressed against the holding frame under an elastic prestress, and wherein the coupling elements engage with each other under the elastic prestress in the predefined end position of the holding part.

4. The device of claim 3, wherein a first one of the coupling elements corresponds to at least one opening provided in the holding frame, and wherein at least one projection formed on the coupling part corresponds to a second one of the coupling elements, the at least one projection projecting toward the holding frame and catching so as to lock in the at least one opening of the holding frame in the predefined end position of the holding part.

5. The device of claim 1, wherein the plurality of fasteners corresponds to a plurality of detention arrangements to fasten the coupling part to the holding part.

6. The device of claim 5, wherein the plurality of detention arrangements are formed on at least one of the holding part and the coupling part in the form of elastically flexible detent hooks.

7. The device of claim 5, wherein the coupling part is a disk made of an elastic material, the disk having an outer ring, at least one projection projecting at an end face of the outer ring, and the disk having a diametral web, wherein at the diametral web a centering cylinder part forming a positive locking with cylinder wall segments of the holding part and one of the detention arrangements are arranged concentrically to the outer ring.

8. The device of claim 1, further comprising:
   a detention arrangement for rotatably fastening the holding part to the holding frame.

9. The device of claim 8, further comprising:
   a plurality of barb-shaped end sections, wherein the detention arrangement projects from the contact surface toward the holding frame and grips behind an edge of a circular cutout of the holding frame via the barbed-shaped end sections.

10. The device of claim 8, wherein the detention arrangement corresponds to at least two elastically flexible cylinder wall segments arranged concentrically to the axis of rotation of the holding part, the at least two elastically flexible cylinder wall segments making contact on mutually opposing inside wall sections of a circular cutout of the holding frame, and each end of the at least two elastically flexible cylinder wall segments including ends provided with a respective shoulder projecting radially outward and gripping behind an edge of the circular cutout.

11. The device of claim 10, wherein the coupling part is a disk made of an elastic material, the disk having an outer ring, at least one projection projecting at an end face of the outer ring, and the disk having a diametral web, wherein at the diametral web a centering cylinder part forming a positive locking with the cylinder wall segments and another detention arrangement are arranged concentrically to the outer ring.

12. The device of claim 1, further comprising:
   a journal projecting from the contact surface of the holding part toward the holding frame, the journal being set radially apart from the axis of rotation and being arranged in a connecting link guide of the holding frame such that the journal is slidingly displaceable.

13. The device of claim 12, wherein the journal engages with an opening provided in the coupling part.

14. The device of claim 1, wherein a screw in a coulisse provided in the holding frame can be fastened to the holding part, the screw being arranged to be slidingly displaceable in an untightened condition.

15. The device of claim 1, wherein a tool can be inserted on a side of the coupling part facing away from the holding frame to rotate an arrangement formed of the coupling part and the holding part.

16. The device of claim 1, wherein the apparatus is arranged in a housing, and wherein the holding frame is a sidewall of the housing.

17. The device of claim 1, wherein the apparatus is a speed sensor.

* * * * *